(12) United States Patent
Sucharczuk et al.

(10) Patent No.: US 6,456,851 B1
(45) Date of Patent: Sep. 24, 2002

(54) WIRELESS COMMUNICATIONS ARCHITECTURE

(75) Inventors: Guy Sucharczuk, Sunnyvale, CA (US); Wanda Wolodkowicz, Santa Clara, CA (US)

(73) Assignee: Aurora Networks, Inc., Santa Clara, CA (US)

( * ) Notice: Subject to any disclaimer, the term of this patent is extended or adjusted under 35 U.S.C. 154(b) by 0 days.

(21) Appl. No.: 09/519,584

(22) Filed: Mar. 6, 2000

(51) Int. Cl.⁷ .................................................. H04Q 7/20
(52) U.S. Cl. ................... 455/454; 455/450; 455/446; 455/66; 455/422; 455/449; 370/338
(58) Field of Search ........................... 455/450, 15, 517, 455/16, 454, 446, 449, 3.01, 3.06, 3.05, 3.04, 448, 422; 725/62, 73; 379/56.2; 370/312, 358, 310, 326, 465, 468; 375/220, 259

(56) References Cited

U.S. PATENT DOCUMENTS

| | | | |
|---|---|---|---|
| 5,394,559 A | * 2/1995 | Hemmie et al. | 455/5.1 |
| 5,579,239 A | * 11/1996 | Freeman et al. | 364/514 C |
| 5,657,317 A | 8/1997 | Mahany et al. | 370/338 |
| 5,684,194 A | 11/1997 | Paneth et al. | 375/283 |
| 5,717,688 A | 2/1998 | Belanger et al. | 370/331 |
| 5,726,984 A | 3/1998 | Kubler et al. | 370/349 |
| 5,729,549 A | * 3/1998 | Kotreski et al. | 370/552 |
| 5,740,214 A | * 4/1998 | Rebec et al. | 375/377 |
| 5,761,605 A | * 6/1998 | Tawil et al. | 455/3.2 |
| 5,875,186 A | 2/1999 | Belanger et al. | 370/331 |
| 5,896,556 A | * 4/1999 | Moreland et al. | 455/5.1 |
| 5,905,719 A | 5/1999 | Arnold et al. | 370/330 |
| 5,924,039 A | * 7/1999 | Hugenberg et al. | 455/454 |
| 5,936,949 A | 8/1999 | Pasternak et al. | 370/328 |
| 5,956,331 A | 9/1999 | Rautiola et al. | 370/338 |
| 5,978,650 A | * 11/1999 | Fischer et al. | 455/3.1 |
| 6,005,876 A | 12/1999 | Cimini, Jr. et al. | 370/525 |
| 6,006,069 A | 12/1999 | Langston | 455/62 |
| 6,175,717 B1 | * 1/2001 | Rebec et al. | 455/3.2 |

FOREIGN PATENT DOCUMENTS

WO    WO 98/57482    12/1998    ............ H04M/3/00

* cited by examiner

*Primary Examiner*—Edward F. Urban
*Assistant Examiner*—Marceau Milord
(74) *Attorney, Agent, or Firm*—Gray Cary Ware & Freidenrich

(57) ABSTRACT

Systems and methods are described for wireless communications. A method includes providing a wireless communications system having narrow cast bi-directional internet channel capability and defining a substantially nonconflicting regional overlay; then transmitting a downstream signal from a downstream transmitter to a bi-directional transceiver; and transmitting an upstream signal from the bi-directional transceiver to an upstream receiver through the substantially nonconflicting regional overlay. The systems and methods provide advantages because additional capacity can be provided within a saturated region without incurring interference and additional capacity can be provided only in the direction in which it is needed.

12 Claims, 1 Drawing Sheet

WIRELESS COMMUNICATIONS ARCHITECTURE

BACKGROUND OF THE INVENTION

1. Field of the Invention

The invention relates generally to the field of wireless communications. More particularly, the invention relates to a wireless communications architecture that provides narrow cast bidirectional channels.

2. Discussion of the Related Art

Prior art wireless communications systems, for instance cellular telephone systems, are known to those skilled in the art. For example, a conventional cellular telephone system typically uses a low power UHF geographically distributed architecture of overlapping cells.

A problem with this technology has been that some geographic regions (e.g., cities) have a high demand for service, but there is limit to the amount of bandwidth that can be installed within a given region. The maximum installable bandwidth is limited by at least two constraints. First, there are a limited number of available frequency pairs (channels) due to government regulations. Second, cells with the same, or similar, frequency pairs must be spaced apart to avoid interference. Once a given region is saturated, no additional capacity can be provided without incurring interference. Therefore, what is required is solution that permits a wireless communications operator to provide additional capacity in a saturate region without incurring interference.

Another problem with this technology has been that as the number and popularity of data services increases, the demand for forward bandwidth is growing much faster than the demand for reverse bandwidth. Adding a cell within a region to satisfy the need for forward bandwidth also adds reverse bandwidth, which may not be needed. Therefore, what is also required is a solution that permits a wireless communications operator to add capacity only in the direction (i.e., forward or reverse) in which it is needed.

Heretofore, the requirements of providing additional capacity within a saturated region without incurring interference, and adding capacity only in the direction in which it is needed referred to above have not been fully met. What is needed is a solution that simultaneously addresses both of these requirements. The invention is directed to meeting these requirements, among others.

SUMMARY OF THE INVENTION

A goal of the invention is to simultaneously satisfy the above-discussed requirements of providing additional capacity within a saturated region without incurring interference, and adding capacity only in the direction in which it is needed which, in the case of the prior art, are not satisfied.

One embodiment of the invention is based on a method, comprising: providing a wireless communications system having narrow cast bi-directional internet channel capability and defining a substantially nonconflicting regional overlay; then transmitting a downstream signal from a downstream transmitter to a bi-directional transceiver; and transmitting an upstream signal from said bi-directional transceiver to an upstream receiver through said substantially nonconflicting regional overlay. Another embodiment of the invention is based on a wireless communications system, comprising: a plurality of downstream transmitters; a plurality of bi-directional transceivers coupled to said plurality of downstream transmitters; and at least one upstream receiver coupled to said plurality of bi-directional transceivers, wherein said wireless communications system i) has narrow cast bi-directional internet channel capability and ii) defines a substantially nonconflicting regional overlay. Another embodiment of the invention is based on a kit to provide a wireless communications system, comprising: a plurality of downstream transmitters; and a plurality of bi-directional transceivers coupled to said plurality of downstream transmitters, wherein said wireless communications system i) has narrow cast bi-directional internet channel capability and ii) defines a substantially nonconflicting regional overlay.

These, and other goals and embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawing accompanying and forming a part of this specification. It should be noted that the features illustrated in the drawing are not necessarily drawn to scale.

DESCRIPTION OF PREFERRED EMBODIMENTS

Figure 1:
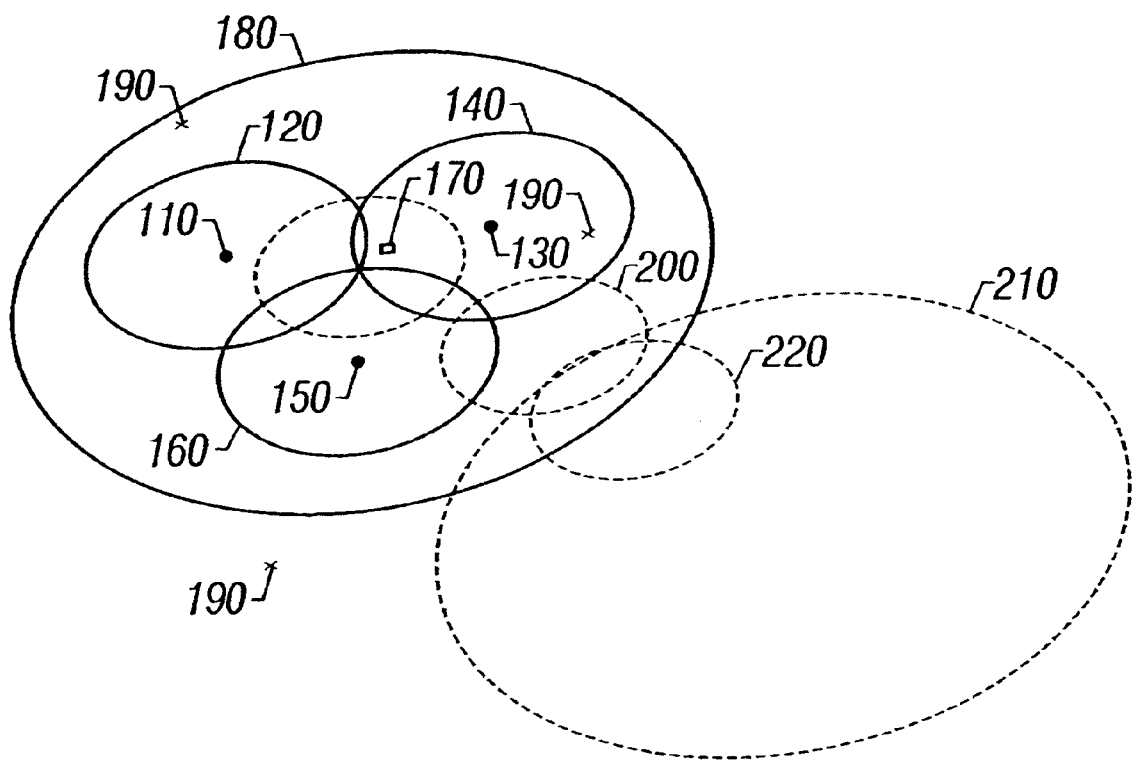
FIG. 1 illustrates a schematic view of a wireless communications architecture having a nonconflicting regional overlay, representing an embodiment of the invention.

The invention and the various features and advantageous details thereof are explained more fully with reference to the nonlimiting embodiments that are illustrated in the accompanying drawing and detailed in the following description of preferred embodiments. Descriptions of well known components and processing techniques are omitted so as not to unnecessarily obscure the invention in detail.

The context of the invention includes wireless communications. The context of the invention also includes voice and data communications. For instance, the context of the invention could include all (or some) of the hardware and/or software involved in deploying a wireless personal data assistant that provides an enduser with internet access.

The invention includes the use of a relatively large number of relatively low power transmitters for downstream communication, for example, content from an internet service provider to an individual in a building, a car, or outside. For instance, the low power transmitters can be mounted on small towers and uniformly distributed across a geographic region (e.g., a city) to provide downstream service to that area. Alternatively, the low power downstream transmitters could be mobile. While not being limited to any particular embodiment, the downstream link could be an approximately 1 watt UHF link. As the demand for downstream communications grows within that region, additional low power transmitters can be added in the areas (e.g., neighborhoods) where additional bandwidth is needed.

The invention also includes the use of a relatively smaller number of relatively wide area receivers for upstream communication, for example, requests from individuals to the internet service provider for new content. Again, the individuals can be in buildings, in cars, or outside. For instance, the wide area receivers can be mounted on large towers and uniformly distributed across the geographic region to provide upstream service to that region. Alternatively, the upstream wide area receivers could be mobile. While not being limited to any particular embodiment, the upstream link could be an approximately 5 watt VHF link. The larger radius served by the receivers results in less upstream bandwidth compared to the downstream bandwidth provided by the low power transmitters. However, this is not a disadvantage where most individuals download much more data than they upload. Of course, the individuals will need to be provided with transceivers that include a relatively powerful transmitter to ensure that the uploading data reaches one of the wide area receivers. The zones of coverage provided by the wide area receivers can be termed a nonconflicting regional overlay.

The invention is counter intuitive. Typically, systems engineers design consumer electronic devices to be as inexpensive as possible. In contrast, the invention recognizes and places a premium on the value of downstream bandwidth. In the context of data delivery, the demand for bandwidth is not symmetric. To provide that greatest amount of downstream bandwidth to the largest number of users across a geographic domain, the relatively large number of bidirectional transceivers can be provided with a more powerful transmitter than the relatively smaller number of downstream transmitters. The tradeoff is less upstream bandwidth, but for most endusers, this is not an issue. Solid state electronics and lithium ion battery technology permits a suitable compact transceiver to be manufactured for only slightly more than the cost of a cellular telephone. For instance, 5–6 watt handheld VHF/UHF transceivers with a volume of approximately 200 cm$^3$ and digital data capability are currently readily commercially available.

The invention can be compatible with a multichannel multipoint distribution service (MMDS) standard. The invention can be compatible with the a local multipoint distribution service (LMDS) standard. The architecture can be reversed where there is a greater need for upstream bandwidth compared to downstream bandwidth.

The invention can be implemented in conjunction with legacy plant equipment. This allows additional cellular capacity to be added to existing systems, especially in the forward (downstream) direction.

The invention can also be included in a kit. The kit can include some, or all, of the components that compose the invention. More specifically, the kit can include one or more upstream receivers, two or more downstream transmitters, two or more bi-directional transceivers, and other components of the invention. The kit can also contain instructions for practicing the invention and additional resources for carrying out the invention. Unless otherwise specified, the instructions, hardware and/or software of the kit can be the same as those used in the invention.

The invention can also utilize data processing methods that transform signals from analog to digital (A/D) and/or from digital to analog (D/A). The invention can also utilize data processing methods that transform signals from one multiple access standard to another. The invention can also utilize the wireless communications bandwidth provided by the system to carry diagnostic information and/or control commands to actuate interconnected discrete hardware elements. As an example of the former, state variable information representing one or more aspects of the system can be the subject of a system query (e.g., periodically reporting the load on a downstream transmitter to a central control computer). As an example of the latter, one or more components of the system can be reconfigured by a system command (e.g., sending a command from a central control computer to a downstream transmitter to reduce output power).

The term approximately, as used herein, is defined as at least close to a given value (e.g., preferably within 10% of, more preferably within 1% of, and most preferably within 0.1% of). The term substantially, as used herein, is defined as at least approaching a given state (e.g., preferably within 10% of, more preferably within 1% of, and most preferably within 0.1% of). The term coupled, as used herein, is defined as at least capable of being connected, although not necessarily directly, and not necessarily mechanically (e.g., capable of being connected for the purpose of data transfer by radio waves). The term resources, as used herein, is defined as hardware and/or software for achieving a result. The term program, as used herein, is defined as two or more lines of code that can be executed by a computer.

EXAMPLE

A specific embodiment of the invention will now be further described by the following, nonlimiting example which will serve to illustrate in some detail various features of significance. The example is intended merely to facilitate an understanding of ways in which the invention may be practiced and to further enable those of skill in the art to practice the invention. Accordingly, the example should not be construed as limiting the scope of the invention.

Referring to FIG. 1, a wireless communications system is depicted. The system includes a plurality of downstream transmitters. A first downstream transmitter 110 covers a first downstream area 120. A second downstream transmitter 130 covers a second downstream area 140 that partially overlaps the first downstream area 120. A third downstream transmitter 150 covers a third downstream area 160 that partially overlaps the first downstream area 120 and/or the second downstream area 140. An upstream receiver 170 covers an upstream area 180 that includes the first downstream area 120, the second downstream area 140 and the third downstream area 160. The areas are not necessarily circular because of propagation and geographic constraints.

Still referring to FIG. 1, a service area is defined by that portion of the upstream area 180 that includes at least one of the downstream areas 120, 140, 160. A plurality of bi-directional transceivers 190 are located in the service area, or at least within the transmit area 180, or outside the transmit area 180.

The wireless communications system has narrow cast bi-directional internet channel capability. The narrow cast aspect refers to forward direction that corresponds to the smaller downstream areas 120, 140, 160. The wireless communications system defines a substantially nonconflicting regional overlay. This aspect refers to the fact that data moving in the reverse direction (upstream) does not interfere with data moving in the forward direction (downstream).

Expansion areas are shown in FIG. 1 with dashed lines. An additional downstream area 200 can be added that will expand the service area. A core downstream area 210 can be added to meet increased demand for downstream bandwidth near the receiver 170. An outlying downstream area 220 lies partially outside the upstream area 180. An additional upstream area 210 provides all of the outlying downstream area 220 with bidirectional capability and partially overlaps with upstream area 180.

Practical Applications of the Invention

A practical application of the invention that has value within the technological arts is cellular telephony. Further, the invention is useful in conjunction with cellular phones (such as are used for the purpose of voice communications), or in conjunction with personal data assistants (such as are used for the purpose of internet browsing), or the like. There are virtually innumerable uses for the invention, all of which need not be detailed here.

Advantages of the Invention

A wireless communication architecture, representing an embodiment of the invention, can be cost effective and advantageous for at least the following reasons. The invention can provide additional capacity within a saturated region without incurring interference. The invention can add capacity only in the direction in which it is needed which.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the downstream transmitter described herein can be a physically separate module, it will be manifest that the downstream transmitter may be integrated into the apparatus with which it is associated (e.g., power supply). Similarly, although the upstream receiver described herein can be a physically separate module, the upstream receiver can be integrated into the apparatus with which it is associated (e.g., antenna tower). Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements.

The appended claims are not to be interpreted as including means-plus-function limitations, unless such a limitation is explicitly recited in a given claim using the phrase "means for." Expedient embodiments of the invention are differentiated by the appended subclaims.

What is claimed is:

1. A method, comprising:
    providing a wireless communications system having narrow cast bi-directional internet channel capability and defining a substantially nonconflicting regional overlay; then
    transmitting a small area downstream signal from a downstream transmitter to a bi-directional transceiver; and
    transmitting an upstream signal from said bi-directional transceiver to a wide area upstream receiver through said substantially nonconflicting regional overlay,
    wherein the narrow cast bi-directional internet channel capability and the non-conflicting regional overlay define an upstream area that overlies a plurality of smaller downstream areas and said narrow cast bi-directional internet channel capability is compatible with a multichannel multipoint distribution service standard.

2. The method of claim 1, wherein said narrow cast bi-directional internet channel capability is compatible with a local multipoint distribution service standard.

3. The method of claim 1, further comprising sending said downstream signal to said downstream transmitter through a multiple telephone line before transmitting said downstream signal from said downstream transmitter to said bi-directional transceiver.

4. A wireless communications system for performing the method of claim 1.

5. A wireless communications system, comprising:
    a plurality of small area downstream transmitters;
    a plurality of bi-directional transceivers coupled to said plurality of small area downstream transmitters; and
    at least one wide area upstream receiver coupled to said plurality of bi-directional transceivers,
    wherein said wireless communications system i) has narrow cast bi-directional internet channel capability and ii) defines a substantially nonconflicting regional overlay,
    wherein the narrow cast bi-directional internet channel capability and the non-conflicting regional overlay define an upstream area that overlies a plurality of smaller downstream areas and
    wherein said narrow cast bi-directional internet channel capability is compatible with a multichannel multipoint distribution service standard.

6. The communications system of claim 5, wherein said narrow cast bi-directional internet channel capability is compatible with a local multipoint distribution service standard.

7. The communications system of claim 5, further comprising a multiple telephone line coupled to said plurality of downstream transmitters.

8. A method for wireless communications which comprises utilizing the wireless communications system of claim 5.

9. A kit to provide a wireless communications system, comprising:
    at least one wide area upstream receiver;
    a plurality of small area downstream transmitters; and
    a plurality of bi-directional transceivers coupled to both said at least one wide area upstream receiver and said plurality of small area downstream transmitters,
    wherein said wireless communications system i) has narrow cast bi-directional internet channel capability and ii) defines a substantially nonconflicting regional overlay,
    wherein the narrow cast bi-directional internet channel capability and the non-conflicting regional overlay define an upstream area that overlies a plurality of smaller downstream areas and
    wherein said narrow cast bi-directional internet channel capability is compatible with a multichannel multipoint distribution service standard.

10. The kit of claim 9, wherein said narrow cast bi-directional internet channel capability is compatible with a local multipoint distribution service standard.

11. The kit of claim 9, further comprising instructions.

12. The kit of claim 9, further comprising software including a program.

* * * * *